UNITED STATES PATENT OFFICE.

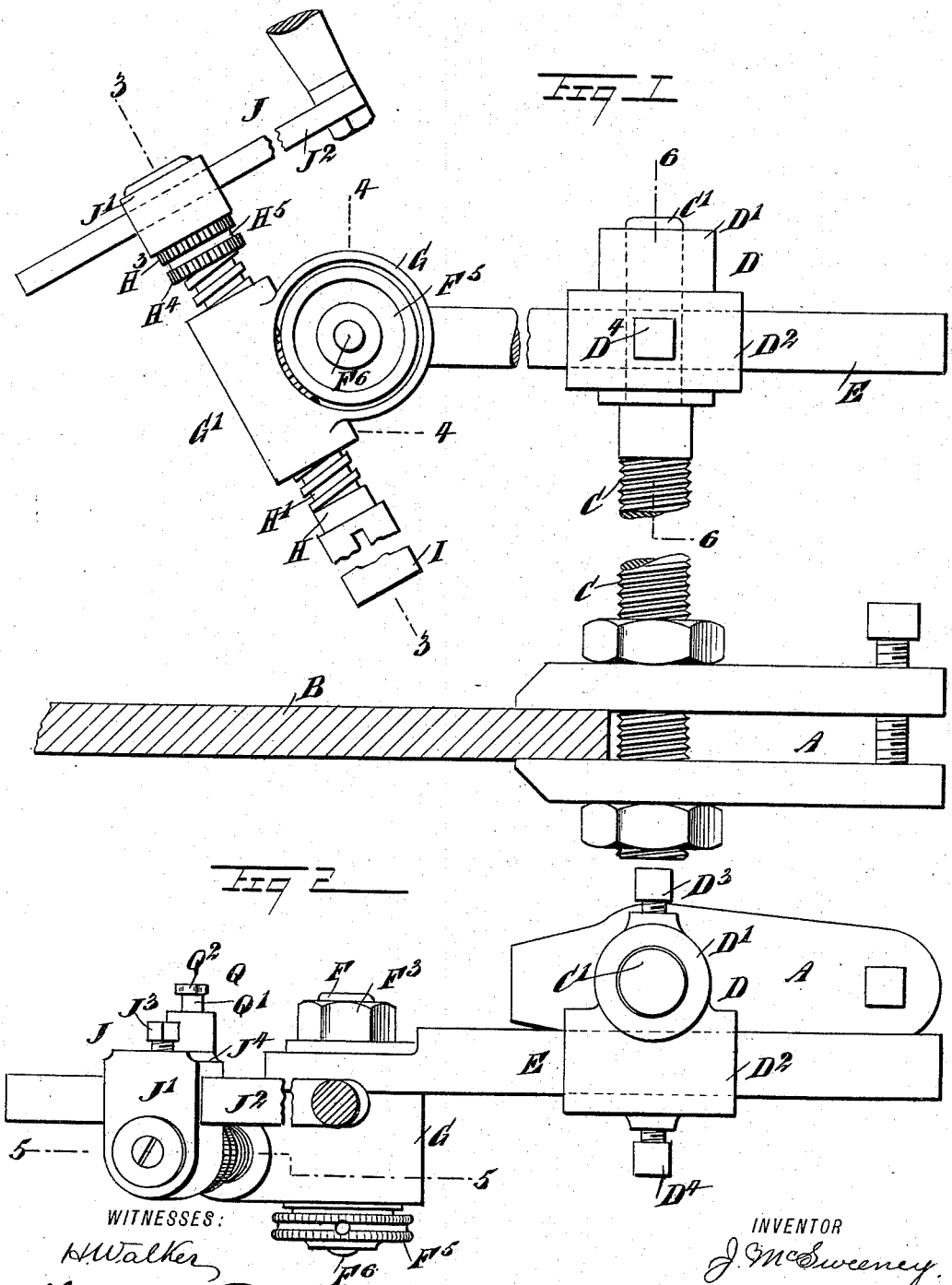

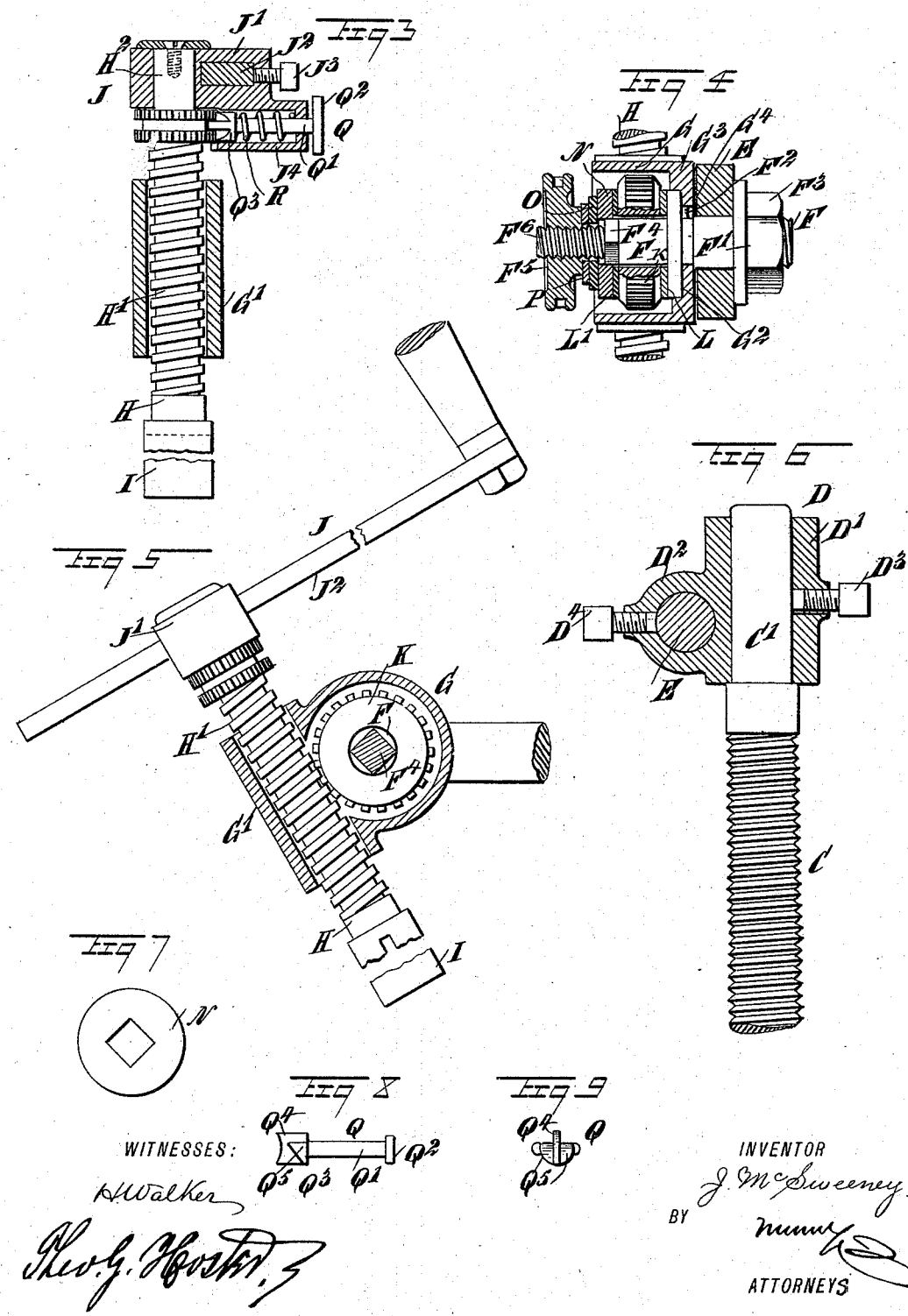

JAMES McSWEENEY, OF PITTSFIELD, MASSACHUSETTS, ASSIGNOR TO THE E. D. JONES & SONS COMPANY, OF SAME PLACE.

HAND-DRILL.

SPECIFICATION forming part of Letters Patent No. 573,231, dated December 15, 1896.

Application filed January 31, 1896. Serial No. 577,555. (No model.)

*To all whom it may concern:*

Be it known that I, JAMES McSWEENEY, of Pittsfield, in the county of Berkshire and State of Massachusetts, have invented certain new and useful Improvements in Hand-Drills, of which the following is a full, clear, and exact description.

The object of the invention is to provide certain new and useful improvements in hand-drills and like tools whereby the feeding of the drill-spindle is automatically regulated according to the nature of the metal or other material under treatment.

The invention consists of certain parts and details and combinations of the same, as will be hereinafter more fully described and then pointed out in the claims.

Reference is to be had to the accompanying drawings, forming a part of this specification, in which similar characters of reference indicate corresponding parts in all the figures.

Figure 1 is a side elevation of the improvement. Fig. 2 is a plan view of the same. Fig. 3 is a transverse section of the same on the line 3 3 of Fig. 1. Fig. 4 is a similar view of the same on the line 4 4 of Fig. 1. Fig. 5 is a sectional side elevation of the improvement on the line 5 5 of Fig. 2. Fig. 6 is a cross-section of part of the improvement on the line 6 6 of Fig. 1. Fig. 7 is a face view of a washer for the friction device. Fig. 8 is a plan view of the key for locking the handle and spindle together, and Fig. 9 is an end view of the same.

The improved hand-drill is provided with a suitably-constructed clamp A for fastening the tool to a table B or other support, and in the said clamp A is held vertically adjustable a threaded post C engaging with its upper reduced end $C'$, a collar $D'$, forming part of a head D, provided with a second collar $D^2$, extending at right angles to the collar $D'$ and adapted to receive a supporting-rod E. The collar $D'$ is adapted to be fastened to the reduced end $C'$ of the post C by a set-screw $D^3$ and a similar set-screw $D^4$ serves to fasten the rod E in place in the collar $D^2$. Thus by the arrangement described the head D can be turned to any desired position on the reduced end $C'$ of the post and then secured in place thereon by screwing up the set-screw $D^3$, and the rod E may be adjusted longitudinally in the collar $D^2$ and fastened in place therein by the set-screw $D^4$.

On the outer end of the rod E is held a transversely-extending bolt F, provided with a collar $F'$, fitting into a recess $G^2$ on the inner face of the end wall $G^3$ of a casing G, the said bolt F being also provided with a pin or lug $F^2$, engaging a recess $G^4$ in the said wall to prevent the casing from turning on the bolt, but to permit the latter with the casing to turn in the rod E when the nut $F^3$ on the bolt is slackened up. The casing G is formed with a bearing $G'$ for the spindle H, carrying at its lower end the usual socket I for receiving and holding the drill or other tool to be used in drilling the metal or other material. On the upper end of the spindle H is arranged a handle J for turning the spindle to bore the hole, as hereinafter described.

The spindle H is provided with a worm-thread $H'$ in mesh with a worm-wheel K, mounted to turn loosely on the bolt F in front of the collar $F'$ within the casing G, as is plainly indicated in Fig. 4. The inner and outer faces of the worm-wheel K abut against washers L and $L'$, of which the washer L rests on the inner face of the collar $F'$, and the other washer $L'$ is pressed on by a metal washer N, having a square aperture fitting on a correspondingly-shaped offset $F^4$, formed on the bolt F, and the washers L and $L'$ are preferably made of fibrous wood or leather, but other similar or suitable material may be substituted. On the outer face of the metallic washer N rests a leather washer O, which in turn is engaged by a leather washer P, engaged by the inner face of a nut $F^5$, screwing on the threaded end $F^6$ of the bolt F. The nut $F^5$ can be turned by hand or by the application of a suitable tool engaging the recesses formed in the periphery of the nut $F^5$. Now it will be seen that the nut $F^5$ can be screwed up with more or less force, so as to retard the turning of the worm-wheel K to a greater or lesser degree, according to the nature of the material under treatment, that is, to insure a faster or slower feeding of the spindle H on turning the handle J.

It will be seen that when the handle J is turned the tool attached to the socket I is revolved, and as the spindle is fitted to slide loosely in its bearing G' and engages the worm-wheel K it naturally tends to turn the latter or to roll off on the latter, according to the resistance against the drill held in the socket and the resistance or retarding power of the worm-wheel K owing to the action of the washers against its faces. Thus if the nut $F^5$ is loosened the spindle H can be readily moved up or down in its bearing G', as then the worm-wheel K rotates loosely on the bolt or stud F, and when the nut $F^5$ is screwed up tightly then the said worm-wheel K is clamped in place by the frictional contact with the washers L L', so that the spindle H when turned screws on the worm-wheel to feed the spindle to the work, and the latter, according to its resisting power, either permits a full feeding of the spindle according to the pitch of the thread H' or only a partial feeding, in which case the wheel K turns gradually on the bolt F.

In order to permit of turning the spindle H in either direction by means of the handle J, I provide the latter with a casing J', mounted to rotate loosely on the upper reduced end $H^2$ of the spindle H. In this casing J' is adjustably held the transversely-extending crank-arm $J^2$, adapted to be fastened in place by a set-screw $J^3$. The lower portion $J^4$ of the casing J' contains a key Q, provided with a stem Q', fitted to slide in the said portion $J^4$ and provided at its outer end with a handle $Q^2$, adapted to be taken hold of by the operator to pull the said key and to turn the same in its bearings for the purpose hereinafter more fully described.

The inner end of the key Q is provided with a head $Q^3$, having a central web $Q^4$ and teeth $Q^5$ on opposite sides thereof, as is plainly indicated in Figs. 8 and 9. The teeth $Q^5$ are adapted to engage the ratchet-wheels $H^3$ and $H^4$, formed or secured on the spindle H adjacent to the casing J'. The wheels $H^3$ and $H^4$ form an annular groove $H^5$ for the passage of the web $Q^4$, which latter is also adapted to engage simultaneously two teeth of the two ratchet-wheels $H^3$ and $H^4$ whenever it is desired to firmly lock the handle J to the spindle to turn the latter in either direction by moving the handle in opposite directions. Now it will be seen that the operator by pulling the handle $Q^2$ can disengage the teeth $Q^5$ from the ratchet-wheels $H^3$ and $H^4$, and then by giving a half-turn to the said key and releasing the same permit the said teeth $Q^5$ to again engage the wheels, but in an opposite direction. By this arrangement the operator by turning the crank-arm $J^2$ in one direction can give a forward or a backward turning motion to the spindle H.

When the operator pulls the key Q outward and gives it a quarter-turn, then the central web $Q^4$ engages the two ratchet-wheels, so that the operator in giving a forward motion to the spindle has to turn the crank-arm $J^2$ in one direction, and in order to give it a backward movement has to turn the crank-arm $J^2$ in the opposite direction.

It will be seen that by the arrangement described the drill can be set to any desired angle. By loosening up the nut $F^3$ on the bolt or stud F the drill-spindle can be set to various angles, or by loosening the said nut and the set-screw $D^4$ the spindle can be turned and the drill set to any desired angle. Thus a universal adjustment of the drilling-tool is obtained.

Having thus described my invention, I claim as new and desire to secure by Letters Patent—

1. A device of the class described, comprising a casing having a bearing for the drill-spindle, a bolt held in the said casing, a worm-wheel mounted to turn loosely on said bolt and in mesh with the external thread of said spindle, washers engaging the faces of said worm-wheel, and means for pressing said washers in contact with the faces of the worm-wheel, substantially as shown and described.

2. In a device of the class described, the combination with a casing, and an exteriorly-threaded drill-spindle mounted in a bearing in the said casing, of a bolt in the casing and having one end projecting therefrom to form a pivot for the casing, a worm-wheel mounted loosely on the bolt in the casing and engaging the drill-spindle, washers on the bolt on opposite sides of the worm-wheel, and a nut on the end of the bolt, substantially as described.

3. In a device of the class described, the combination with a supporting-rod, of a casing having a bearing at one side, a drill-spindle exteriorly threaded and mounted in the bearing of the casing, a bolt in the casing and serving to secure the casing to said arm, a worm-wheel loosely mounted on the bolt and engaging the drill-spindle, washers on the bolt on opposite sides of the worm-wheel, and a nut on the bolt, substantially as described.

4. In a device of the class described, the combination with a supporting-rod having an apertured end, of a casing having a bearing, a threaded drill-spindle mounted on the bearing, a bolt projecting through and secured to the casing to turn therewith, said bolt having screw-threaded ends and provided with a collar at about the middle of its length, one end of the bolt projecting through the aperture of the said rod, a worm-wheel on the bolt in the casing and meshing with the spindle, washers on the bolt on opposite sides of the worm-wheel and nuts on the ends of the said bolt, substantially as described.

5. In a device of the class described, the combination with a post, a head adjustable on the said post, and an arm adjustably secured to the said head and having its other end apertured, of a casing provided with a bearing, a threaded drill-spindle mounted in the said bearing, a bolt secured to the casing to turn therewith and having one end projecting therefrom to pass through the aperture of the said arm, a worm-wheel loosely mounted on the bolt in the casing and meshing with the drill-spindle, washers on the bolt on opposite sides of the worm-wheel, and nuts on the ends of the bolt, substantially as described.

JAMES McSWEENEY.

Witnesses:
R. B. BARDWELL,
C. A. RAYMOND.